United States Patent
Talvitie et al.

(10) Patent No.: US 11,403,003 B2
(45) Date of Patent: Aug. 2, 2022

(54) MEMORY ACCESS

(71) Applicant: Nordic Semiconductor ASA, Trondheim (NO)

(72) Inventors: Hannu Talvitie, Trondheim (NO); Marko Winblad, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 17/054,038

(22) PCT Filed: May 10, 2019

(86) PCT No.: PCT/EP2019/062077
§ 371 (c)(1),
(2) Date: Nov. 9, 2020

(87) PCT Pub. No.: WO2019/215338
PCT Pub. Date: Nov. 14, 2019

(65) Prior Publication Data
US 2021/0232327 A1    Jul. 29, 2021

(30) Foreign Application Priority Data

May 10, 2018 (GB) ..................... 1807589

(51) Int. Cl.
*G06F 3/06* (2006.01)
*G06F 13/28* (2006.01)

(52) U.S. Cl.
CPC .......... *G06F 3/0622* (2013.01); *G06F 3/0655* (2013.01); *G06F 3/0673* (2013.01); *G06F 13/28* (2013.01); *G06F 2213/28* (2013.01)

(58) Field of Classification Search
CPC .. G06F 12/1433; G06F 12/1491; G06F 13/28; G06F 2212/1052; G06F 2213/28;
(Continued)

(56) References Cited

U.S. PATENT DOCUMENTS

| | | | |
|---|---|---|---|
| 11,108,781 B2* | 8/2021 | Kumaraswamy | ..... H04L 63/107 |
| 2002/0129299 A1* | 9/2002 | McKee | ................. G06F 9/4812 |
| | | | 714/38.13 |

(Continued)

OTHER PUBLICATIONS

International Search Report and Written Opinion for PCT/EP2019/062077, dated Aug. 19, 2019, 12 pages.
IPO Search Report under Section 17(5), dated Nov. 2, 2018, 7 pages.
Many but Finite(/), Aug. 20, 2008, manybutfinite.com, "CPU Rings, Privilege, and Protection", available from: https://manybutfinite.com/post/cpurings-privilege-and-protection/, accessed Oct. 31, 2018, 8 pages.

(Continued)

*Primary Examiner* — Zhuo H Li
(74) *Attorney, Agent, or Firm* — Klarquist Sparkman, LLP (57) ABSTRACT

An electronic device comprises a processor operable at a variable processor privilege level and a memory comprising a secure memory area. A hardware module is operable at a variable module privilege level and is arranged to access the memory directly. The secure memory area is accessible by the hardware module only when the module privilege level exceeds a threshold value. The device has a first mode of operation in which said processor privilege level is higher than said threshold value and said module privilege level is lower than said threshold value. A controller is arranged, upon receiving a privilege promotion signal and the device being in the first mode, to move the device to a second mode wherein the module privilege level is higher than said threshold value.

15 Claims, 4 Drawing Sheets

(58) Field of Classification Search
CPC .... G06F 3/0622; G06F 3/0655; G06F 3/0673; Y02D 10/00
See application file for complete search history.

(56) References Cited

U.S. PATENT DOCUMENTS

| | | |
|---|---|---|
| 2003/0084256 A1 | 5/2003 | McKee |
| 2004/0177266 A1* | 9/2004 | Moyer .................. G06F 21/85 713/189 |
| 2006/0005019 A1* | 1/2006 | Chao ..................... G06F 21/52 713/166 |
| 2014/0006739 A1 | 1/2014 | Dixon et al. |
| 2015/0332069 A1 | 11/2015 | Circello et al. |
| 2016/0034300 A1 | 2/2016 | Fukushima |

OTHER PUBLICATIONS

Stackoverflow, Aug. 23, 2017, stackoverflow.com, "How hardware privilege levels are manipulated in x86 processor", available from: https://stackoverflow.comlquestions/3 7000074/how-hardware-privilegelevels-are-manipulated-in-x8 6-processor, accessed Oct. 31, 2018, See answers dated May 23, 2017 and May 3, 2016, 3 pages.

Wikipedia, May 4, 2018, wikipedia.org, "Protection Ring", available from: https://en.wikipedia.org/w/index.php?title=Protection_ring&oldid=8395 39300, accessed Oct. 31, 2018, See "Privilege Level" section, 7 pages.

* cited by examiner

MEMORY ACCESS

CROSS REFERENCE TO RELATED APPLICATIONS

This is the U.S. National Stage of International Application No. PCT/EP2019/062077, filed May 10, 2019, which was published in English under PCT Article 21(2), which in turn claims the benefit of Great Britain Application No. 1807589.5, filed May 10, 2018.

TECHNICAL FIELD

The present invention relates to memory access, in particular to providing variable levels of privileged memory access to a hardware component, particularly a component having direct memory access, within an electronic device such as a system-on-chip device.

BACKGROUND

In general, electronic devices are typically provided with a microprocessor, memory (volatile and/or non-volatile memory), and one or more peripheral hardware components. While such peripheral devices could, in some implementations, only have access to the memory via the microprocessor, it is preferable in some cases to provide a peripheral device with direct memory access (DMA), wherein the peripheral can access some or all addresses within the memory directly, without having to involve the microprocessor.

Within the electronic device, the memory may contain sensitive data, for example private encryption keys, that must be kept secure.

It is known in the art to restrict read, write or execute access to memory on a microprocessor in order to prevent unauthorised access to data or programs. Typically, certain trusted code can always gain full access to restricted and unrestricted memory areas—e.g., by causing a processor on the microprocessor to enter a privileged mode and then accessing a restricted memory area.

DMA-capable components may have different privilege and/or security levels (for example user mode versus supervisor mode; or secure mode versus non-secure mode) that depend on a given configuration. In order to share resources efficiently, the same component may be set to act as either a privileged bus master or an unprivileged bus master. An example of privileged bus accesses are ARM® AXI4 bus accesses, where signal "AxPROT[0]" defines bus access privilege level (unprivileged/privileged) and signal "AxPROT[1]" defines bus access security level (non-secure/secure).

These settings may be determined statically, for example by hard-wiring the hardware component to use a particular, predetermined combination of privilege level signals. The settings may also be determined dynamically by another privileged bus master, e.g. a processor running in a secure state.

However, the Applicant has appreciated that conventional methods of promoting DMA-capable hardware components known in the art per se may be susceptible to security issues. Specifically, there may be a risk that, once the hardware component has been promoted to a privileged level such that it can access restricted memory areas, unsecure software may be able to exploit this and access the restricted memory areas that it is not supposed to.

SUMMARY OF THE INVENTION

When viewed from a first aspect, the present invention provides an electronic device comprising:
a processor operable at a variable processor privilege level;
a memory comprising a secure memory area;
a hardware module operable at a variable module privilege level arranged to access the memory directly, wherein the secure memory area is accessible by the hardware module only when the module privilege level exceeds a threshold value;
wherein the device has a first mode of operation in which said processor privilege level is higher than said threshold value and said module privilege level is lower than said threshold value, the device further comprising a controller arranged, upon receiving a privilege promotion signal and the device being in the first mode, to move the device to a second mode wherein the module privilege level is higher than said threshold value.

This first aspect of the present invention extends to a method of operating an electronic device, the electronic device comprising:
a processor operable at a variable processor privilege level;
a memory comprising a secure memory area;
a controller; and
a hardware module operable at a variable module privilege level arranged to access the memory directly, wherein the secure memory area is accessible by the hardware module only when the module privilege level exceeds a threshold value;
the method comprising:
operating the device in a first mode of operation in which said processor privilege level is higher than said threshold value and said module privilege level is lower than said threshold value;
the controller receiving a privilege promotion signal while the device is in the first mode;
subsequently operating the device in a second mode wherein the module privilege level is higher than said threshold value.

This first aspect of the present invention also extends to a non-transitory computer readable medium comprising instructions that, when executed on a suitable processor, cause the processor to carry out a method of operating an electronic device, the electronic device comprising:
a processor operable at a variable processor privilege level;
a memory comprising a secure memory area;
a controller; and
a hardware module operable at a variable module privilege level arranged to access the memory directly, wherein the secure memory area is accessible by the hardware module only when the module privilege level exceeds a threshold value;
the method comprising:
operating the device in a first mode of operation in which said processor privilege level is higher than said threshold value and said module privilege level is lower than said threshold value;
the controller receiving a privilege promotion signal while the device is in the first mode;
subsequently operating the device in a second mode wherein the module privilege level is higher than said threshold value.

Thus it will be appreciated by those skilled in the art that in accordance with at least embodiments of the present invention, an improved electronic device (and associated method and non-transitory computer readable medium) is provided wherein hardware components, e.g. DMA-capable hardware components, may be promoted to a privilege level sufficient to allow them to access the secure memory area as long as the processor itself has a sufficient privilege level to access the secure memory area.

Those skilled in the art will appreciate that the hardware module being able to access the memory 'directly' means that the hardware module can make read and/or write accesses to the memory contents without involving the processor. As outlined above, this is typically referred to in the art as 'direct memory access' or 'DMA'. This should be understood to be an entirely separate concept to having the processor or another separate module arbitrate accesses to memory based on a privilege level associated with a given request to access data.

The privilege promotion signal could be issued by an intermediate module—e.g. a dedicated module—or finite state machine which is able to take account of the processor privilege level. Preferably, however, the privilege promotion signal is provided directly by the processor to the controller.

Once the hardware module has been promoted (i.e. its privilege level has been raised above the threshold), the processor may be able to drop to a lower privilege level without affecting the operation of the promoted hardware module. Thus, for example, the processor can promote the hardware module while running privileged software and then switch to running different, unprivileged (or less privileged) software while allowing the hardware module to keep its privilege level and carry on making privileged bus accesses to the secure memory area. However, in a set of embodiments the processor cannot interact with the hardware module or change its operation while the processor privilege level is below the threshold value, i.e. when the processor is running unprivileged (or less privileged) software. This may prevent unwanted accesses to the secure memory area by unprivileged software.

In addition to the enhanced security outlined above, embodiments of the present invention may consume less power, respond faster, and/or require less memory accesses than conventional approaches. These advantages are achievable because the hardware module can remain in its privileged state, performing secure bus accesses, while the processor can perform an entirely different task or even go to sleep (i.e. into a low power or idle mode), thus making better use of the resources available.

The hardware module may continue making privileged bus accesses to the secure memory area as long as the hardware privilege level remains sufficiently high. In some arrangements, the hardware component may maintain this privilege level indefinitely until the processor changes the privilege level of the hardware component. Thus, in a set of embodiments, the controller is further arranged such that, upon receiving a privilege demotion signal, the controller reduces the module privilege level below said threshold value. Preferably the processor privilege level must be above the threshold for the privilege demotion signal to be issued.

In some potentially overlapping embodiments, the hardware module is arranged to reduce its privilege level below the threshold automatically. This may, in some embodiments, be based on a timer such that the module privilege level is reduced once a predetermined period has elapsed. In some alternative embodiments, however, the module privilege level is reduced when the hardware module no longer needs to access the secure memory area. This advantageously prevents the hardware module remaining at an elevated privilege level for longer than is necessary, further enhancing the security of the device.

In a set of embodiments there are two possible values that the processor privilege level can take: one above the threshold value and one below, i.e. the processor privilege level is switchable between a first processor privilege value above the threshold value and a second processor privilege value below the threshold value. In an overlapping set of embodiments there are two possible values that the module privilege level can take: one above the threshold value and one below, i.e. the module privilege level is switchable between a first module privilege value above the threshold value and a second module privilege value below the threshold value. In either case the respective privilege level may that be binary such that an entity can either be unprivileged or privileged.

However, one or both of the processor and module privilege levels could be set to more than two different values. Thus, in some embodiments, the processor privilege level is switchable between a plurality of processor privilege values, wherein at least a first of said processor privilege values is above the threshold value and at least a second of said processor privilege values is below the threshold value. Similarly, in a potentially overlapping set of embodiments, the module privilege level is switchable between a plurality of module privilege values, wherein at least a first of said module privilege values is above the threshold value and at least a second of said module privilege values is below the threshold value.

The additional privilege levels could be provided above and/or below the threshold value. Thus, in accordance with such embodiments, a hierarchical (i.e. multi-level) privilege system can be utilised and thus provide for more complex relationships between the software running on the processor and the privilege levels that can be assigned to the hardware module. This allows for more refined control over the privilege levels of the processor and hardware components. For example, normal unprivileged access may be level '0' and 'normal' privileged access may be level '1', however the processor may have secure supervisor (i.e. root or kernel mode) code that runs at a higher privilege level, e.g. at level '2', such that the supervisor may resume control over the hardware module if necessary.

Where, as set out above, additional processor and/or module privilege levels are provided, the device could be arranged such that the module privilege level can be raised above to any available value above the threshold value when the processor privilege level is at any value above the threshold value. In a set of embodiments however the module privilege level can only be raised to a value equal to or lower than the processor privilege level.

In a set of embodiments, the memory comprises a plurality of secure memory areas each being accessible by the hardware module only when the second privilege level exceeds a respective threshold value associated with said secure memory area. At least some of the respective threshold values may be different from each other. Those skilled in the art will appreciate that such embodiments provide a tiered structure where having a certain level of privilege may entitle the hardware module to access some but not all of the secure memory areas.

While having more than two possible values for the processor and module privilege levels may provide for a 'sliding scale' of privilege levels, having more than two privilege values may additionally or alternatively provide a mechanism to restrict the hardware module to specific sections of the secure memory area or, in embodiments where there are multiple secure memory areas, to one or more specific secure memory areas. Thus in some embodiments, a section of the secure memory area may be accessible by the hardware module only if the module privilege level is set to a specific value. For example, the secure memory area may contain two different private encryption keys, used for unrelated applications, e.g. for two different radio protocols. These may be stored in separate sections of the secure memory area (or, where appropriate, in different secure memory areas) such that the part of memory containing the first private encryption key is accessible if the hardware module privilege level has a value '1A' and the part of memory containing the second private encryption key is accessible if the hardware component privilege level has a value '1B'. Meanwhile, if the hardware module is running at a higher privilege level, e.g. level '2', it may be able to access both parts, i.e. it could access the respective parts of the secure memory that contain each private encryption key at the same time. Other more complex hierarchies are envisioned and fall within the scope of the present invention.

Another possible application of multiple privilege levels is to allow differentiation between read and write access. Thus whilst the processor and/or module privilege levels could apply equally to reading and writing, in other embodiments for at least one of the processor and the hardware module, write access to the secure memory could be subject to a different threshold value to read access.

BRIEF DESCRIPTION OF DRAWINGS

Certain embodiments of the invention will now be described, by way of example only, with reference to the accompanying drawings in which.

DETAILED DESCRIPTION

Figure 1:
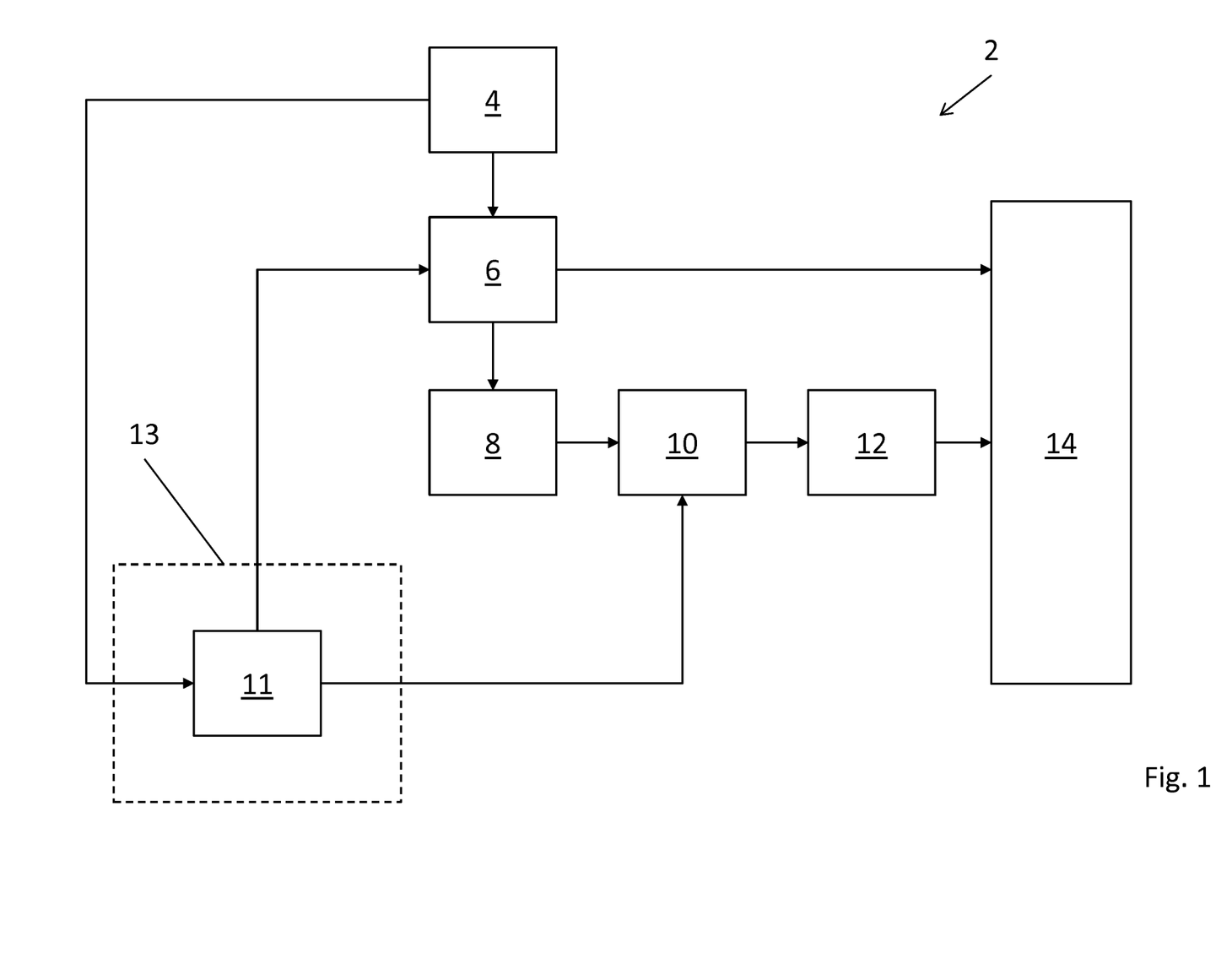
FIG. 1 is a block diagram of an electronic device in accordance with an embodiment of the present invention.

FIG. 1 is a block diagram of an electronic device 2 in accordance with an embodiment of the present invention. The device 2 comprises: a microprocessor 4; a first access control module 6; a DMA-capable hardware module 8; an access promotion module 10; a second access control module 12; and memory 14.

Figure 2:
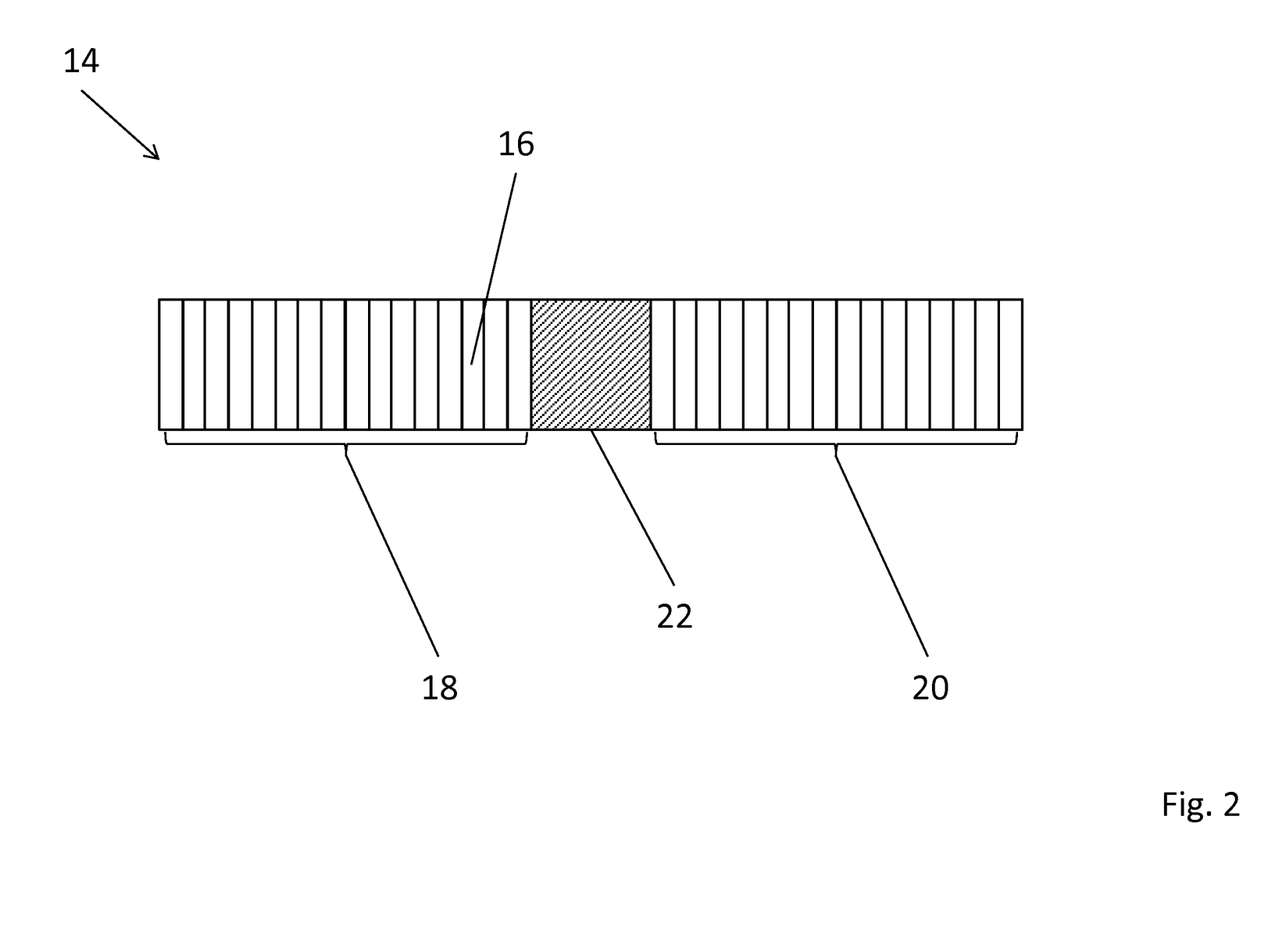
FIG. 2 is a schematic diagram of the memory in the device of FIG. 1.

The memory 14 is divided into different logical areas as can be seen in FIG. 2. The memory 14 includes a number of memory registers 16, where some of these memory registers 16 collectively form a non-secure memory area 18, while others form a secure memory area 20. As will be described in further detail below, the secure memory area 20 can only be accessed by components having a certain privilege level (or greater), while the non-secure memory area 18 can be accessed by any components.

It will be appreciated that the non-secure memory area 18 is not necessarily continuous with the secure memory area 20, and there may be a separation 22 of one or more registers between these memory areas 20, 22. The memory areas 20, 22 are also not necessarily physically continuous themselves, and may be logically continuous, where each area 20, 22 is defined in memory by, for example, a look up table or other means known in the art per se.

For the purpose of this example, the privilege levels that a component may have are '0' or '1', i.e. low or high respectively. The non-secure memory area 18 can be accessed by a component regardless of whether its privilege level is '0' or '1', while the secure memory area 20 can be accessed only by a component having privilege level '1'.

While this example makes use of a simple binary threshold for ease of illustration, it will be appreciated that, in general, there may be many different logical areas within the memory 14 that have different minimum privilege level requirements in order to access their content. There may also be different privilege level requirements for reading and writing operations.

Referring back to FIG. 1, the microprocessor 4 has an associated privilege level that can be varied based on the software it is running. For example, root or kernel level operations may be associated with secure software having a higher privilege level than application level operations that are associated with non-secure software, for example software installed by a user. In the binary privilege system described above, the secure software affords the microprocessor 4 with privilege level '1' while the non-secure software affords the microprocessor 4 with only the privilege level '0'.

The microprocessor 4 accesses the memory 14 via the first access control module 6. If the microprocessor 4 is running non-secure software (and thus has the normal privilege level '0'), it can access only the non-secure memory area 18. Conversely, if the microprocessor 4 is running secure software (and thus has the elevated privilege level '1'), the microprocessor 4 can access both the non-secure memory area 18 and the secure memory area 20.

Similarly, the DMA-capable hardware module 8 also has an associated privilege level which can be varied. The DMA-capable hardware module 8 is arranged to access the memory 14 directly, i.e. without requiring any interaction with the microprocessor 4. If the DMA-capable hardware module 8 has the normal privilege level '0', it can access only the non-secure memory area 18. Conversely, if the DMA-capable hardware module 8 has the elevated privilege level '1', the DMA-capable hardware module 8 can access both the non-secure memory area 18 and the secure memory area 20.

The privilege level of the DMA-capable hardware module 8 may be controlled by the microprocessor 4. There is a controller 11 arranged to receive privilege control signals from the microprocessor 4, where these privilege control signals are used to vary the privilege level of the DMA-capable hardware module 8 by means of the first access promotion module 10. This functionality is described in further detail below with reference to FIG. 4.

Figure 3:
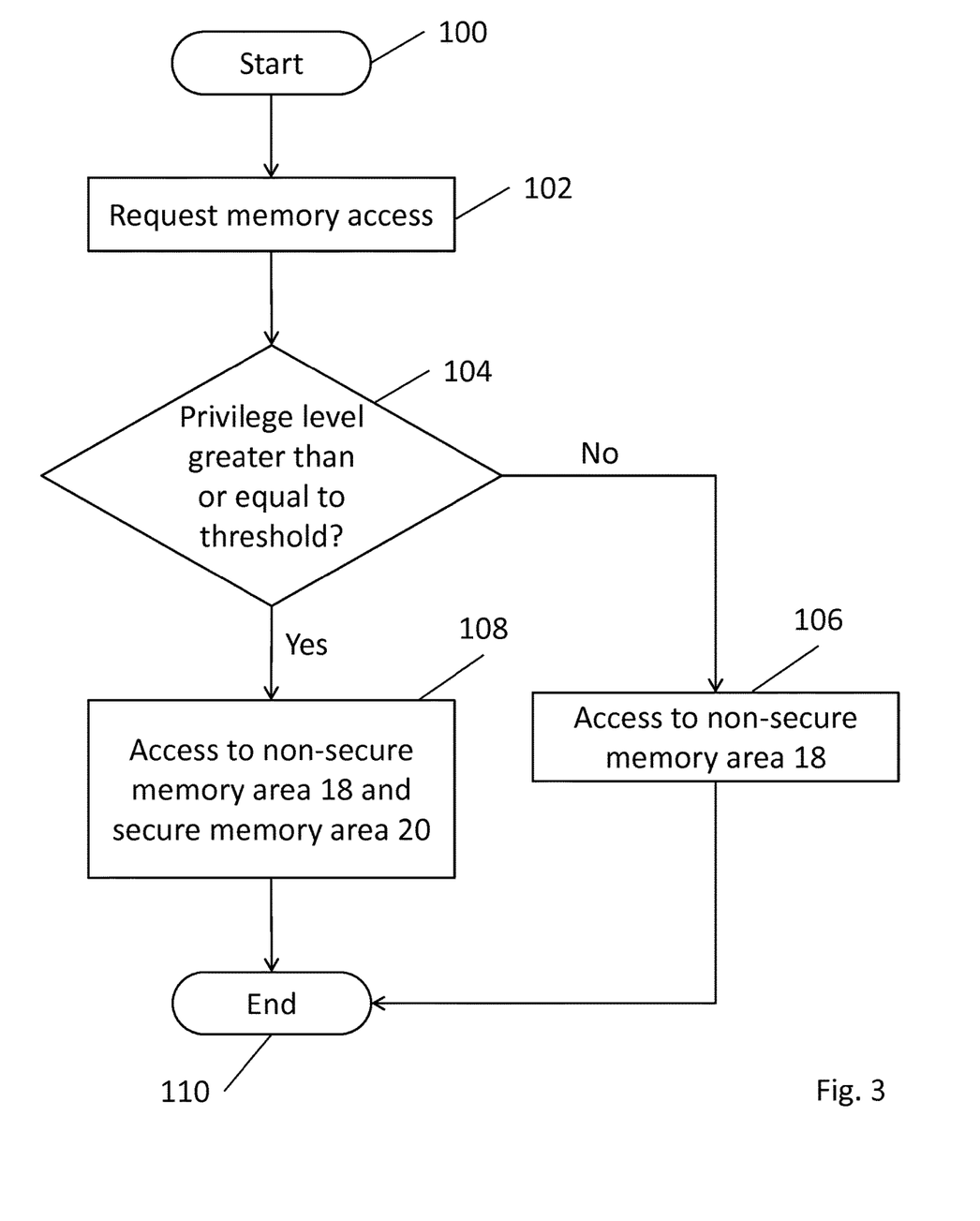
FIG. 3 is a flow chart illustrating memory accesses made by the components in the device of FIG. 1.

The process by which checks are made when the microprocessor 4 or the DMA-capable hardware module 8 attempt to access the memory 14 is illustrated in FIG. 3, which is a flow chart that shows memory accesses made by the components in the device 2 of FIG. 1.

Following initialisation at step 100, the component—which may be the microprocessor 4 or the DMA-capable hardware module 8—requests access to the memory 14 at step 102. Typically the request to access the memory 14 will specify whether the component wishes to access the non-secure memory area 18 or the secure memory area 20.

The respective access control module 6, 12 checks the privilege level of the component (microprocessor or hardware module) 4, 8 to determine whether the privilege level is equal to or greater than the threshold for accessing the secure memory area 20 at step 104. In this particular example, as explained above, the threshold value is '1'.

If the privilege level of the component 4, 8 is too low, i.e. if it is '0', the component 4, 8 is granted access only to the non-secure memory area 18 at step 106. However, if the privilege level of the component 4, 8 is sufficiently high, i.e. if it is '1', the component 4, 8 is granted access to both the non-secure memory area 18 and the secure memory area 20 at step 108. The process then ends 110.

Figure 4:
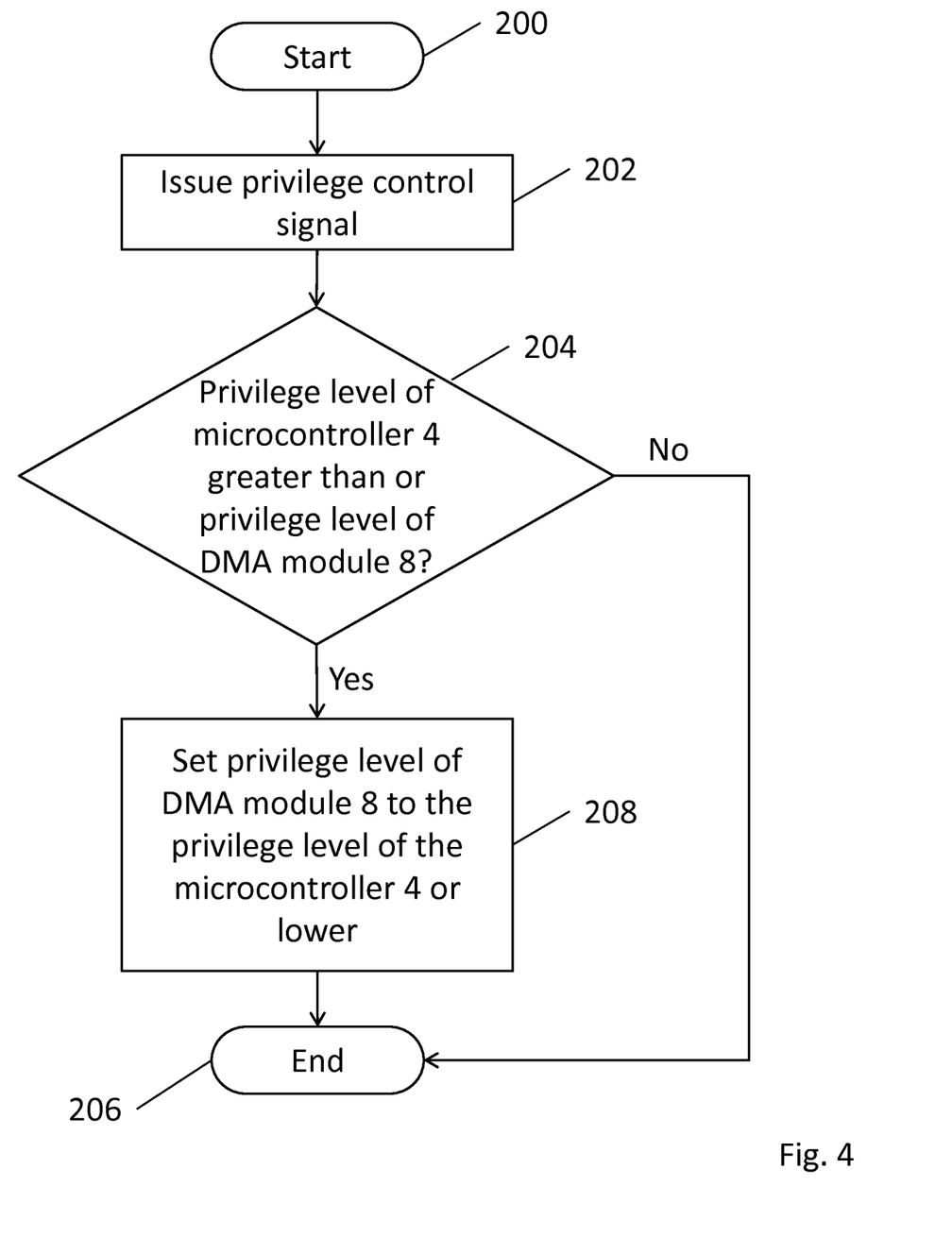
FIG. 4 is a flow chart illustrating a microprocessor controlling the privilege level of a DMA-capable hardware component within the device of FIG. 1.

As outlined above, the microprocessor 4 may generate privilege control signals in order to vary the privilege level of the DMA-capable hardware module 8. These privilege control signals are passed to a promotion control module 11 which may set the privilege level of the DMA-capable hardware module 8 to a new value above the threshold for secure memory access. The new value will typically be equal to or less than a current value of the privilege level of the microprocessor 4. FIG. 4 is a flow chart illustrating the microprocessor 4 controlling the privilege level of the device 2 of FIG. 1. The promotion control module 11 exists within the 'secure world' 13 and so can only be accessed by secure (i.e. privileged) software.

Following initialisation at step 200, the microprocessor 4 issues a privilege control signal, indicating that it wishes to change the privilege level of the DMA-capable hardware module 8, at step 202. Typically the privilege control signal will specify the privilege level that the microprocessor wishes to set the DMA-capable hardware module 8 to, i.e. it may be a promotion control signal or a demotion control signal, i.e. a signal indicating that the microprocessor 4 wishes to increase or decrease the privilege level of the DMA-capable hardware module 8 respectively.

The promotion control module 11 checks the privilege level of the microprocessor 4 to determine whether it is above the threshold and may also check whether it is equal to or greater than the privilege level of the DMA-capable hardware module 8 at step 204.

If the privilege level of the microprocessor 4 is less than that of the DMA-capable hardware module 8, i.e. if the privilege level of the microprocessor is '0' and the privilege level of the DMA-capable hardware module 8 is '1', the request is ignored and the process ends 206. However, if the privilege level of the microprocessor 4 is above the threshold—i.e. greater than or equal to that of the DMA-capable hardware module 8, the promotion control module 11, at step 208, sets the privilege level of the DMA-capable hardware module 8 to the level requested in the privilege control signal by passing a suitable control signal to the access promotion module 10 connected between the DMA-capable hardware module 8 and the second access control module 12. The process then ends 206.

Once the privilege level of the DMA-capable hardware module 8 has been raised, it may remain in its privileged state, performing secure bus accesses to the secure memory area 20. In the meantime, the processor 4 can perform an entirely different task or even go to sleep (i.e. into a low power or idle mode) and may reduce its own privilege level below that of the DMA-capable hardware module 8.

The DMA-capable hardware module 8 can continue making privileged bus accesses to the secure memory area 20 as long as the privilege level of the DMA-capable hardware module 8 remains sufficiently high (i.e. so long as it remains '1'). The DMA-capable hardware module 8 may maintain this privilege level indefinitely, or it may reduce its privilege level automatically when it has finished with its current access to the secure memory area 20.

However, in the presently described embodiment, so long as the DMA-capable hardware module 8 is in its elevated privilege state, the processor 4 is unable to revert the privilege level of the DMA-capable hardware module 8 unless its privilege level is equal to or greater than that of the DMA-capable hardware module 8. This enhances the security of the device 2 because unprivileged software is not able to gain access to the secure memory area 20 via the DMA-capable hardware module 8.

Thus it will be appreciated by those skilled in the art that embodiments of the present invention provide a power efficient but secure way of allowing a hardware module to access an area of secure memory. It will be appreciated by those skilled in the art that the embodiments described above are merely exemplary and are not limiting on the scope of the invention.

The invention claimed is:

1. An electronic device comprising:
   a processor operable at a variable processor privilege level;
   a memory comprising a secure memory area;
   a hardware module operable at a variable module privilege level arranged to access the memory directly, wherein the secure memory area is accessible by the hardware module only when the variable module privilege level exceeds a threshold value;
   wherein the device has a first mode of operation in which said variable processor privilege level is higher than said threshold value and said variable module privilege level is lower than said threshold value, the device further comprising a controller arranged, upon receiving a privilege promotion signal and the device being in the first mode, to move the device to a second mode wherein the variable module privilege level is higher than said threshold value;
   wherein the hardware module is arranged to reduce the variable module privilege level below the threshold value automatically; and
   wherein the processor cannot interact with the hardware module or change its operation while the variable processor privilege level is below the threshold value.

2. The electronic device as claimed in claim 1, wherein the privilege promotion signal is provided directly by the processor to the controller.

3. The electronic device as claimed in claim 1, wherein the controller is further arranged such that, upon receiving a privilege demotion signal, the controller reduces the variable module privilege level below said threshold value.

4. The electronic device as claimed in claim 3, wherein the variable processor privilege level must be above the threshold value for the privilege demotion signal to be issued.

5. The electronic device as claimed in claim 1, further comprising a timer arranged such that the variable module privilege level is reduced once a predetermined period has elapsed.

6. The electronic device as claimed in claim 1, wherein the variable module privilege level is reduced when the hardware module no longer needs to access the secure memory area.

7. The electronic device as claimed in claim 1, wherein the variable processor privilege level is switchable between a first variable processor privilege value above the threshold value and a second variable processor privilege value below the threshold value.

8. The electronic device as claimed in claim 1, wherein the variable processor privilege level is switchable between a plurality of variable processor privilege values, wherein at least a first of said variable processor privilege values is above the threshold value and at least a second of said variable processor privilege values is below the threshold value.

9. The electronic device as claimed in claim 1, wherein there the variable module privilege level is switchable between a first variable module privilege value above the threshold value and a second variable module privilege value below the threshold value.

10. The electronic device as claimed in claim 1, wherein the variable module privilege level is switchable between a plurality of variable module privilege values, wherein at least a first of said variable module privilege values is above the threshold value and at least a second of said variable module privilege values is below the threshold value.

11. The electronic device as claimed in claim 1, wherein the variable module privilege level can only be raised to a value equal to or lower than the variable processor privilege level.

12. The electronic device as claimed in claim 1, wherein the memory comprises a plurality of secure memory areas each being accessible by the hardware module only when the variable module privilege level exceeds a respective threshold value associated with said secure memory area.

13. The electronic device as claimed in claim 12, wherein a section of the secure memory area may be accessible by the hardware module only if the variable module privilege level is set to a specific value.

14. A method of operating an electronic device, the electronic device comprising:
- a processor operable at a variable processor privilege level;
- a memory comprising a secure memory area;
- a controller; and
- a hardware module operable at a variable module privilege level arranged to access the memory directly, wherein the secure memory area is accessible by the hardware module only when the variable module privilege level exceeds a threshold value;

the method comprising:
operating the device in a first mode of operation in which said variable processor privilege level is higher than said threshold value and said variable module privilege level is lower than said threshold value;
the controller receiving a privilege promotion signal while the device is in the first mode;
subsequently operating the device in a second mode wherein the variable module privilege level is higher than said threshold value; and
the hardware module reducing the variable module privilege level below the threshold value automatically;
wherein the processor cannot interact with the hardware module or change its operation while the variable processor privilege level is below the threshold value.

15. A non-transitory computer readable medium comprising instructions that, when executed on a suitable processor, cause the processor to carry out a method of operating an electronic device, the electronic device comprising:
- a processor operable at a variable processor privilege level;
- a memory comprising a secure memory area;
- a controller; and
- a hardware module operable at a variable module privilege level arranged to access the memory directly, wherein the secure memory area is accessible by the hardware module only when the variable module privilege level exceeds a threshold value;

the method comprising:
operating the device in a first mode of operation in which said variable processor privilege level is higher than said threshold value and said variable module privilege level is lower than said threshold value;
the controller receiving a privilege promotion signal while the device is in the first mode;
subsequently operating the device in a second mode wherein the variable module privilege level is higher than said threshold value; and
the hardware module reducing the variable module privilege level below the threshold value automatically;
wherein the processor cannot interact with the hardware module or change its operation while the variable processor privilege level is below the threshold value.

* * * * *

UNITED STATES PATENT AND TRADEMARK OFFICE
CERTIFICATE OF CORRECTION

PATENT NO. : 11,403,003 B2
APPLICATION NO. : 17/054038
DATED : August 2, 2022
INVENTOR(S) : Talvitie et al.

Page 1 of 1

It is certified that error appears in the above-identified patent and that said Letters Patent is hereby corrected as shown below:

In the Claims

Column 9,
Lines 11-12, Claim 9, "wherein there the variable" should be --wherein the variable--

Signed and Sealed this
Eighteenth Day of April, 2023

Katherine Kelly Vidal
*Director of the United States Patent and Trademark Office*